March 29, 1938.   C. W. McKONE   2,112,783
METHOD OF MAKING A PNEUMATIC TIRE
Filed Jan. 30, 1937   2 Sheets-Sheet 1

Inventor
Charles W. McKone
By
Dodge and Son
Attorneys

March 29, 1938. C. W. McKONE 2,112,783
METHOD OF MAKING A PNEUMATIC TIRE
Filed Jan. 30, 1937 2 Sheets-Sheet 2
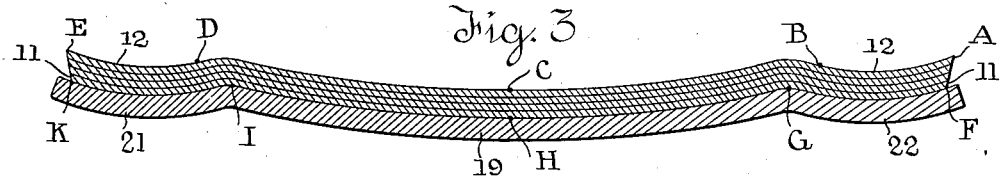
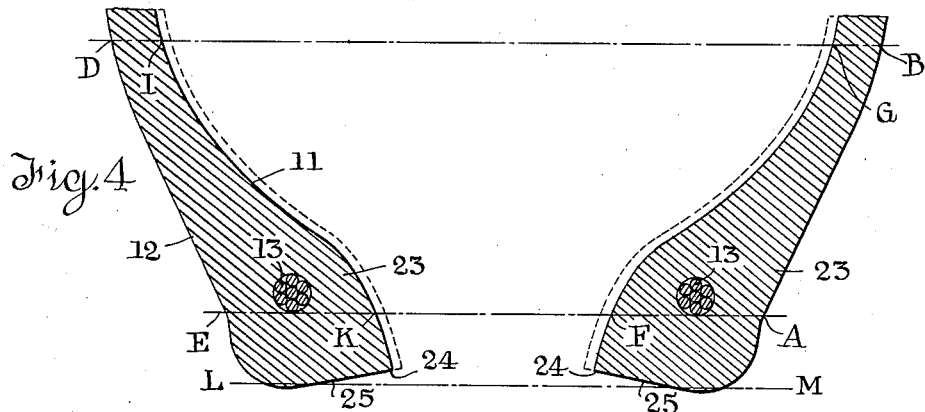
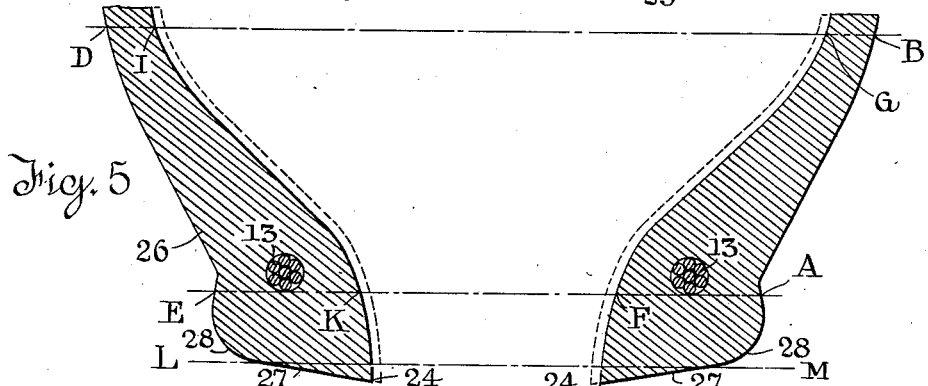
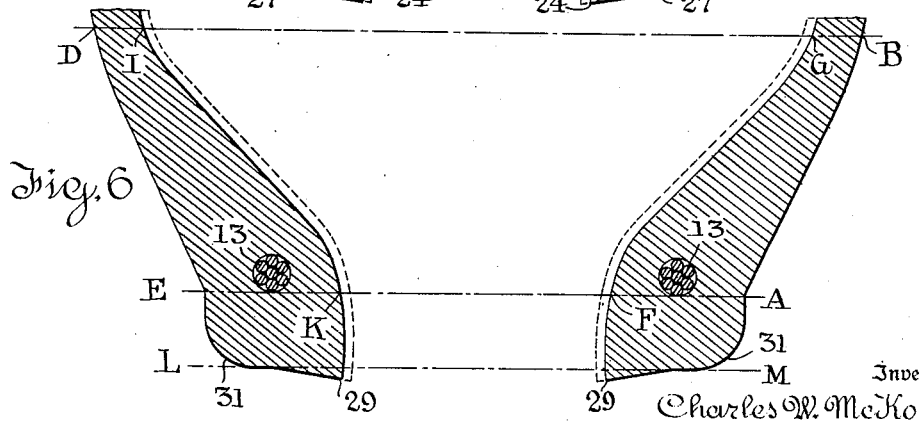
Inventor
Charles W. McKone
By
Dodge and Dows
Attorneys Patented Mar. 29, 1938

2,112,783

UNITED STATES PATENT OFFICE 2,112,783

METHOD OF MAKING A PNEUMATIC TIRE

Charles W. McKone, Washington, D. C.

Application January 30, 1937, Serial No. 123,303

6 Claims. (Cl. 154—14)

This invention relates to pneumatic tires and particularly to an improved method of building the same.

In the prior art practice relating to the building of tires, certain more or less stereotyped lines of procedure have been adopted and, in many cases, have been followed blindly on the assumption that such lines of procedure were correct for the production of a tire of maximum quality.

It has been well known for a long time that the bead formation of tires is difficult, and that during the expansion of the plies to form a carcass, the plies pull out of position at the beads and also change their angle at the beads, so that there is often great difficulty in producing a strong and symmetrical structure. The purpose of this invention, then, is to bring out in a logical manner the causes of tire failure and to build the tire in such a way that the usual weaknesses are anticipated and avoided. Hence, the finished tire does not have to be modified to give it a finished appearance, nor does it have to be weakened for this purpose.

In the prior art, two well recognized lines of procedure have been practiced generally in the building of a tire carcass. The most common method in practice is to lay the plies on a drum, such drum being flat, or shouldered, or undercut at the bead portions, either with or without the tread stock in position, and then to expand the band and to shape the carcass ready for the application of the side walls and the other steps of finishing the tire ready for vulcanization. In practicing this method, it is well known that the various plies are subjected to unequal stretching during the expanding operation. When the tire is expanded against the mold, the outer plies come to a fixed position quickly so that the movement of this outer ply consists of expansion only. The inner plies not only expand, due to the pressure from within, but the plies are composed of more or less yielding or compressible material, so that these inner plies must expand not only as a result of the pressure upon them from within, but also due to the compression of the intermediate and inner plies as they become compacted. The net result of this action is to cause the inner plies to be subjected to greater stretch than the outer plies, and this differential stretch becomes greater as the number of plies is increased. A tire constructed according to present practice invariably has inner plies which are too short and during the bead formation it is necessary to stress these plies unduly in order to form the bead. Thus, the cord angles change, and the tire structure as a whole weakened because the cords are subjected to unnatural stresses and strains, and they are thrown out of balance from one part of the tire to another. It is impossible to predict where the points of weakness are, and they become known only when the tire, in service, breaks at the point of weakness caused by the incipient changes which have occurred in the initial building of the tire.

Another method of building tire carcasses which has been practiced, consists in forming the carcass on a solid core having a cross-section approximating that of a finished carcass. The same inequalities between inner and outer plies resulting from the differential of stretch due to ply compression and expansion are present in tires built by this method.

After giving extensive thought and study to this problem, I have found that the difficulties heretofore met can be avoided by making the inner ply widths greater than normally so as to compensate for the variation due to expansion and compression, and to graduate the widths of the plies so as to produce uniform tension on all plies of the finished tire. This method may be practiced in several ways, and it is even possible to lay the plies in position into contact with the tread stock on the building drum before the carcass is expanded. In any event, the net result of the practice of this method is to cause the stretch in all plies to be so modulated during shaping and subsequent expansion and compression in the vulcanizing process, that the plies balance, or substantially balance one another, and undergo a minimum of movement from positions in which they are initially laid. Hence the beads form symmetrically, with minimum change in cord angle. According to this method, the expansion of the tire against the mold may be carried out by any of the methods at present known, and the method may be coordinated with ordinary standard apparatus by one or two simple changes.

The main object of this invention is to produce a tire in which the cords are all under uniform tension throughout, thus avoiding localization of stresses upon any particular cords or sets of cords, or parts of the cords.

Another object of the invention is to so fabricate a tire as to compensate for the effects of compression of the plies during expansion and compression in the mold.

Other objects of the invention will be more clearly understood from reading the following specification in connection with the accompanying drawings in which:

Fig. 3 is a sectional view of a modified form of building drum, also embodying this invention;

Fig. 4 is a sectional diagrammatic view of a portion of a vulcanized tire stripped of its covering and illustrating how the equalization of the plies during expansion and compression may be assisted by tipping the beads inwardly during the molding of the tire;

Fig. 5 is a view similar to Fig. 4, but showing a modified molding position in which the beads are tipped outwardly during the molding process; and Fig. 6 is a view similar to Fig. 5 showing the inner portions only of the beads tipped outwardly during the molding process.

Figure 1:
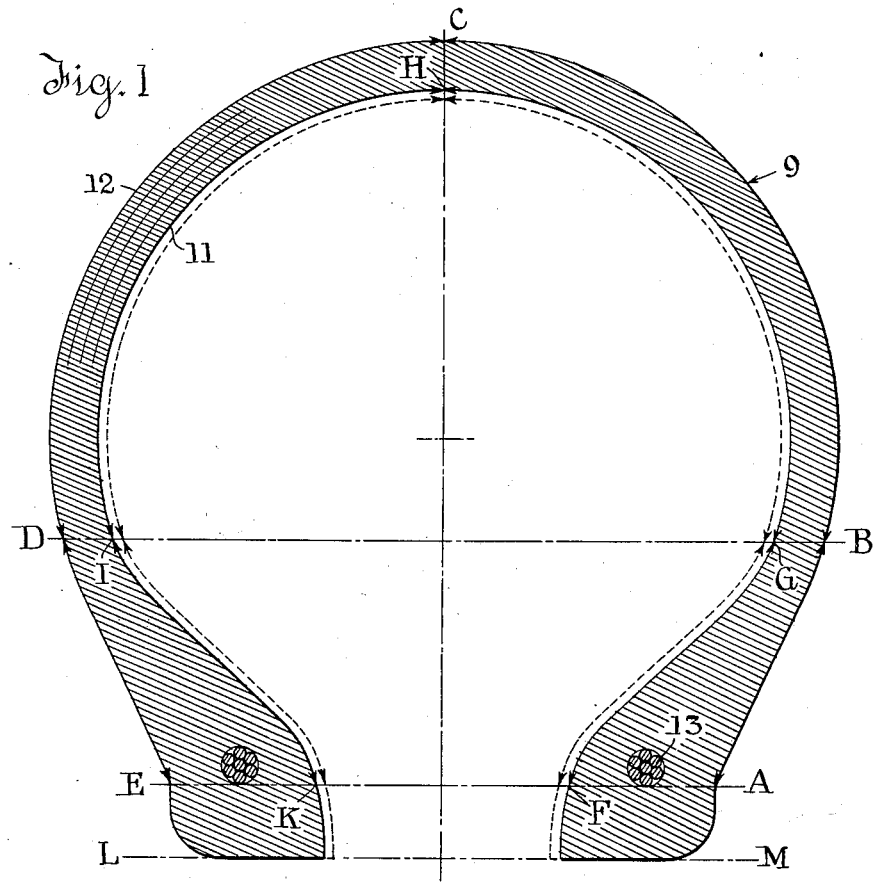
Figure 1 is a diagrammatic view of a vulcanized tire section, stripped of its coverings and illustrating how the compression of the plies affects the ply lengths in the finished structure.

In following this description, reference may be had to the diagrammatic view of Fig. 1 in which reference character 9 designates generally a tire vulcanized and stripped of its covering and made up of a plurality of plies, only four of which are shown. The innermost ply is designated 11 and the outermost ply 12 in the drawings. In the making of tires according to usual methods, the peripheral width of the ply 12 indicated by line ACE is greater than the corresponding width of the ply 11 along the line FHK. This is necessarily so because of the longer radius of curvature of the ply 12. When the tire made up of these plies is placed in a mold and expanded against that mold, the stretch of the ply 12 is limited by its assuming its position quickly within the rigid mold. The ply 11, on the contrary, is stretched into close engagement with the intermediate plies of the tire as a result of the expansion, and then those intermediate plies become compressed so that the position of the ply 11 changes from that indicated by the dotted line to that of the full line FHK. The difference in the lengths of these two lines is due to the compression of the tire plies, and this difference generally amounts to approximately 11 millimeters in a 32 x 6 tire. According to present practice, this compression factor is not considered and, consequently, when the carcass is expanded into the mold and vulcanized, the inner plies draw away from the beads, or the cord angles change, making bead shaping difficult and introducing irregularities and unbalance throughout the cord structure. While it is known to take into account the stretch imparted to the plies resulting from the expansion within the mold, the compression factor has hitherto been overlooked or disregarded. According to the present invention, the plies are so fashioned on the building structure that when the tire is expanded into the mold and subjected to expansion and compression in the vulcanizing process, an equalization or substantial equalization takes place in the plies, and in the vulcanized tire they occupy their proper positions coinciding with previous mathematical computations. In this way, the tire is entirely free of unbalanced stresses and, at the same time, pulling at the beads is eliminated.

Before describing the details of the present method, further analysis will be made of the relation of the plies in a tire of the character of the one illustrated in Fig. 1. In that figure, the line BD indicates the approximate point at which the bead reinforcing strips terminate, and also the point in the finished tire where the direction of curvature on the inside changes. Mathematically speaking, the line BD designates the approximate inflection point in the tire, and the following analysis will indicate why tire failures very frequently occur in the side walls in the vicinity of this line.

Following the previous assumption that the vulcanized tire 9 is of 32 x 6 dimensions, the lines designated will have approximately the following dimensions:

$$BCD = 275 \text{ mm.}$$
$$GHI = 250 \text{ mm.}$$
$$AB = DE = 80 \text{ mm.}$$
$$FG = IK = 85 \text{ mm.}$$

It will be seen from the above that whereas the width of the ply 12 along BCD is 275 millimeters as compared with the length 250 millimeters of ply 11 along line GHI, the distances AB and DE are less than the distances FG and IK. Accordingly, the total outside width of ply 12 computed from the line AE passing through the bead wires 13 amounts to:

$$2 \times AB + 275 = 435 \text{ mm.}$$

Similarly, the total length of ply 11 equals:

$$2 \times FG + 250 = 420 \text{ mm.}$$

Consequently, while the dimension BCD exceeds that of GHI, and the outside dimensions AB and DE are each less than the corresponding inside dimensions FG and IK, the total width of ply 12 is 435 millimeters as compared with the width of ply 11 being 420 millimeters. The difference in width between the plies 11 and 12 then amounts to 15 millimeters representing the expansion. Calculation shows that the difference in length between line FHK and the corresponding dotted line is approximately 11 millimeters representing the compression factor. The total variation in width between the inner and outer plies when the tire is completely stretched and vulcanized in position, amounts to 15 millimeters plus the compression of 11 millimeters, making a total of 26 millimeters. According to this invention, if the ply 11 is initially formed so that the length of the dotted line FHK equals 420 millimeters plus the compression of 11 millimeters, total 431 millimeters, the plies 11 and 12 may be made to substantially balance in the vulcanized tire. By careful calculation, the two factors of compression and expansion may be made to equalize almost exactly so that the plies in the finished tire will all be under equal tension and they will occupy their calculated positions, thus avoiding entirely the uncertain variations which are characteristic of present methods.

The terms "expansion" and "expansion factor" as used in this specification refer to the difference in cross sectional peripheries between the outermost and the innermost plies in the vulcanized tire, and are to be so construed.

In present methods of building tire carcasses on a drum, it is usual to lay the plies on this drum with the narrower ones next to the drum, and to build up the plies successively wider to take care of the increase in peripheral cross section of the tire. In building a tire according to the improved method, the line of procedure is almost directly opposite to that adopted heretofore, and involves making the inner plies of greater cross sectional periphery than heretofore, in order to compensate for expansion and compression. It includes the use of a building surface fashioned to compensate for the fact that the peripheral widths of the inside plies between the inflection line and the bead line are greater than the corresponding outside dimensions. In Fig. 1 this means that the distances FG and IK are always greater than the corresponding distances AB and DE.

Practice of the present invention preferably includes the use of a drum having predetermined dimensions, and embodying a curvature such that after the plies are properly cut and laid in position, it will be unnecessary for them to make any substantial change during shaping or during or after expansion and compression.

Stated generally, it may be said that the drum, or form, must include on each side of its tread portion and at a point approximating the location of line B—D in Fig. 1 a concave section or portion in which the plies are laid, and from which they become inverted on expansion of the carcass in the mold. The cross section of the form may approximate a sine curve with at least two inflection points and it must embody reverse curvatures a few of which are illustrated in the drawings. In this way the inner plies may be made to embody the necessary increase in peripheral width to prevent excessive stretching of the inner plies, change in cord angle and other undesirable results which are characteristic of prior art methods of tire building when the inner plies are too narrow.

The broad principle set forth above may be embodied in numerous different ways. However, in order to make this principle clear, there has been shown in Fig. 2 of the drawings one form of building drum which is suitable for carrying out methods embodying this invention. It will be pointed out in detail just how the curvature is calculated.

Figure 2:
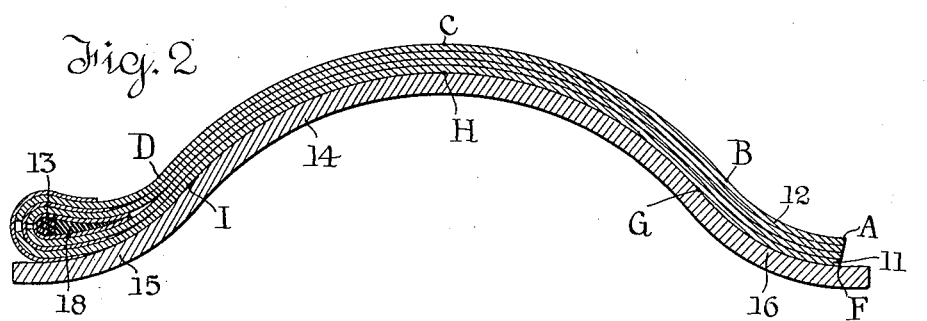
Fig. 2 is a sectional view of one form of building drum which may be utilized in carrying out the principles of this invention.

The drum is constructed with a central convex tread portion 14 merging into two lateral concave portions 15 and 16. The scale of Fig. 2 is chosen to be exactly one-half that indicated in Fig. 1, in order that the proportions may be correct. In Fig. 2, the reference letters employed correspond to those in Fig. 1 in order to make it clear how the measurements are taken. Explanation has been simplified by assuming that 9 is a four ply tire, the inner and outer plies being designated 11 and 12, respectively, as in Fig. 1.

It will be understood that in practicing methods embodying this invention, drums will be constructed for the different sizes of tire to be made. The width of plies will be calculated in accordance with the particular tire sizes, and when such calculation has once been made for a particular size of tire, it remains only to lay the plies up according to the principles hereinafter set forth. In Fig. 2, the line BCD corresponds to line BCD in Fig. 1, and this line is longer for the ply 12 than is the corresponding line GHI for ply 11. On the contrary, however, the line AB is shorter than corresponding line FG, and the concave dip 16 of the building drum permits these variations in outside and inside distances to be taken care of without wrinkling of the plies as they are laid on the drum. Whereas, in the usual methods of building tires, the outer ply 12 would always be wider than the inner ply 11, in this method the inner ply 11 will be of the same width as or wider than the ply 12.

Except for the fashioning of the building drum and the proportioning of ply widths, the method here described may correspond to other present practice so far as expansion of the carcass and forming of the same is concerned. For purposes of illustration, it has been indicated in Fig. 2 that one of the beads has been formed in the concave section 15. The bead wire 13, the flipper 18, and the other reinforcing strips are now placed in position. Inasmuch as there must be relative turning movement between the bead wires and their coverings during shaping and expansion of the carcass, it is advisable to cover these wires with friction reducing means or lubricant such as zinc stearate or equivalent material. The bead wires 13 are, preferably, of circular cross section and where the braided cable has a rough exterior it may be taped spirally to make its surface smooth before the lubricant is applied. The bead will be formed in the concave section 16 before the carcass is expanded, but the present showing has been adopted in order to bring out clearly the fact that the inner ply 11 is of a width sufficient to take care of the compression factor, when the carcass is expanded against the mold. It will be understood that the intermediate plies are dimensioned in accordance with the compression and expansion which they are to undergo, and will bear a predetermined and calculated relation to the widths of the plies 11 and 12.

In order to make it clear how this method is carried out, it will be assumed that a building drum is to be constructed to embody the features already set forth. In forming this drum and in dimensioning the plies which are to be used in any particular tire, it is necessary that two dimensions be predetermined. These dimensions are (1) The peripheral cross-sectional widths of the innermost and the outermost plies in the vulcanized tire.

(2) The compression factor of the cords in the plies in passing from the unvulcanized to the vulcanized state.

In order to produce a tire in which the cord tensions are uniform throughout, it is necessary to determine the curvatures of the building drum from the two factors (1) and (2) given above, in such a way that in the finished vulcanized tire the compression and expansion factors will be balanced. There must be enough material in the inner plies to take care of the compression, and to permit symmetrical and unstressed formation of the bead free from pulling and shifting of cord angles. In bringing this about, it will necessarily follow that the peripheral width of the innermost ply will be greater than in constructions according to present methods, and that this width will actually in most cases be greater than the width of the outermost ply.

It will be assumed that the building drum 14 has been constructed to embody the principles just set forth, and that a four ply tire is to be constructed on that drum according to the principles of the present invention. The innermost ply 11 will be constructed of such a width that after expansion and compression have taken place, these plies will be in a position to embrace the bead wires symmetrically without pulling or change of angle. According to the dimensions set forth in Fig. 1, the peripheral width of ply 11 will be aproximately 431 millimeters, that is, it will embody the length FHK of 420 millimeters, plus the compression factor of 11 millimeters. The intermediate plies will be proportioned so as to graduate in width from that of ply 11 to that of the outside ply 12, the latter having the dimensions of 435 millimeters along the line ABCDE. Any standard cord material can, of course, be employed, and the angles of the cord chosen according to conventional practice.

After the desired number of plies are in position as indicated in Fig. 2, the beads are formed and their reinforcing strips placed in position as indicated. The dimensions given in connection with the concave section 16 correspond to those of Fig. 1 in order to illustrate the principles of the invention. However, the point A is on the bead line AE, and hence additional width of ply will be required to complete the bead in the manner indicated in connection with the concave section 15.

After the beads have been formed, the plies will be covered and removed from the building drum and expanded into the mold by any of the usual methods such as the vacuum method. While it is possible to expand the carcass against a tread which has been preliminarily placed in position in a mold section, the structure shown in Fig. 2 is well adapted to have the tread stock and side walls applied on top of the ply 12 in accordance with known practice, before expansion into the mold. This invention is not concerned with the particular method of expansion or shaping, and numerous methods may be adopted in conformity with the other features which constitute the present improvement. It should be pointed out, however, that because of the peculiar shaping of the building drum, or form, and the manner in which the plies are laid on it, the formed beads will snap into position in the curing mold very readily, and without the present characteristic difficulties.

After the carcass, with its coverings, is expanded against the mold, and the tire vulcanized, the finished product will be characterized by uniform, balanced structure throughout. No particular cords or sets of cords or parts of the same will be unduly stressed, but the stresses will be distributed throughout the entire structure. The plies in the vicinity of the beads will be uniformly and symmetrically located with respect to central vertical planes passing longitudinally through the bead wires. The cords of all the plies will occupy the positions which they had in the original forming of the plies, substantially free from shifting or other changes which are incident to present methods of tire building. While it has been indicated that a building drum of the configuration shown in Fig. 2 may be used, it is to be understood that other forms of drum may be utilized and constructed to embody the principles of the invention. One modified form of drum is shown in Fig. 3.

The building drum shown in Fig. 3 illustrates another way in which the plies can be fashioned to compensate for the compression factor. In this figure, the drum comprises a central upwardly concave tread portion 19 having lateral concave portions 21 and 22 merging therewith. The curvature of this drum surface may be calculated according to the principles set forth in connection with Fig. 2, and accordingly the reference letters shown in Fig. 3 correspond to those of Figs. 1 and 2. Here, as before, the innermost ply is designated 11 and rests upon the surface of the drum, whereas the outermost ply 12 is shorter than the ply 11 and is the last ply laid on the drum for contact with the tread and side walls of the tire. It will be understood that the central dip 19 of this drum should not be pronounced, but only sufficient to take care of the excess length of ply 11 over that of ply 12. The concave portions 21 and 22, which are of major importance, will, of course, de designed exactly as the portions 15 and 16 are in Fig. 2. The scale of Fig. 3 is the same as that of Fig. 2 and is one-half that in Fig. 1. This brings out clearly the fact that the inner plies must necessarily be of somewhat greater width than they are according to previous practice.

The broad principles of the invention have been set forth and the application of these principles to tire building have been pointed out as they are performed by fashioning the plies on a particular shape of building or forming drum. It is possible, however, to carry out the principles of the present invention in other ways so long as provision is made in the inner plies of the carcass, whereby the compression factor may be compensated to produce a balanced construction. For example, as indicated in Fig. 4, the compression factor may be balanced by tilting the beads upwardly.

In Fig. 4, reference character 23 designates the bead portions of a tire made up of a plurality of plies similar to those indicated in Fig. 1. The tire is shown in its completed vulcanized state with the lines ABDE and FGIK designating the outer and inner ply widths respectively, as before. The dotted line indicates the position of the innermost ply before the tire is vulcanized, and the full line the position of that ply after vulcanization. Whereas, in normal methods of tire manufacture, the completed tire has bead portions substantially horizontal for contact with the surfaces of a flat rim, this tire has the beads tilted during vulcanization so that the toes 24 of the beads are tilted upwardly and inwardly making the surfaces 25 inclined to the horizontal. The line LM may be referred to as the "rim line" forming a part of the "rim circle". The mold in which the tire is shaped is provided with inserts to hold the beads in this tipped or tilted position, so that it becomes unnecessary for the inner plies to extend so far down in the finished tire. Consequently, the compression factor may be balanced out by making the distance between the toes 24 of the beads and the rim line LM equal to one-half of the compression factor for the innermost ply. In this way, the inner plies may be designed according to my new method, and then the tire vulcanized in a special mold with tipped beads to compensate for the compression.

When a tire such as that shown in Fig. 4 is placed on a rim, the faces 25 of the beads assume a horizontal position similar to that indicated by rim line LM, and this results in placing the inner plies of the tire under heavier tension than the outer ones. This imparts stability to the structure but cannot exert any undue stresses on the cords, since they have all been vulcanized into their proper positions and cannot shift so long as their union is maintained. While it is preferred, in practicing this invention, to use a special type of building drum or form, it is clear from Fig. 4 that helpful results may be brought about by the use of conventional building drums and a special type of mold to tip the beads as in Fig. 4.

Fig. 5 of the drawings show still another method of building a tire according to the principles of this invention. So far in this specification, it has been pointed out that compensation for the compression factor may be brought about in either of two ways, that is, (1) by increasing the inside ply widths over those of present practice or (2) by following present practice and then vulcanizing the tire with the beads tilted as in Fig. 4. In many instances, it may be found difficult to get the necessary amount of inner ply material in place, using the conventional type of mold in which the faces of the beads are parallel to the rim line. All such difficulties may be avoided by the use of plies formed after calculating the extra length of the inner plies and then vulcanizing the tire in a mold with the toes of the beads tilted downwardly and outwardly as in Fig. 5 of the drawings.

Referring now to Fig. 5 of the drawings, the reference character 26 designates a tire similar to that shown in Figs. 1 and 4 except for the formation of the beads. The tire, as shown, has the form which it shows after vulcanization. Here, as before, the inside ply has been indicated by dotted lines and by full lines to show how this ply is effected by the compression. This tire above the line AE has characteristics similar to those of the tires shown in Figs. 1 and 4, but the bead formation is in marked contrast to those figures. Here the tire is shaped in a mold so that the toes 24 of the beads are tilted downwardly leaving the faces 27 of the beads inclined to the line LM. In other words, in the finished vulcanized tire, the toes 24 of the beads are below the line LM, instead of being on that line as in usual practice, or above that line as in Fig. 4, and the heels 28 are above the line LM. In making a tire according to Fig. 5, the inner plies are made longer than the outer plies, and by an amount at least sufficient to balance the compression. The tilting of the beads to the position shown makes it possible to utilize sufficient material to do this. The additional material present will enable the plies to take a balanced position and to compensate for the compression factor without in any way interfering with proper shaping and vulcanizing of the bead, and without pulling or shifting of cord angle. When the tire, shown in Fig. 5, is placed on a rim, the toes 24 will abut the rim causing a tilting of the bead structure upwardly until the faces 27 come into coincidence with the line LM.

The effect of this tilting is to tend to rotate the tire and to put the outer plies under stronger tension than the inner plies and the inner plies are compressed to stiffen the tread, it being distinctly understood that this does not affect the tension applied to the cords, since the cords are securely vulcanized to the rubber structure throughout. This change of tension on the tire, results in a far more stable tire than has heretofore been suggested or produced. All tendency to sagging is avoided and it is not necessary that the tire structure as a whole be altered in shape during the steps of manufacture, the only change being the use of more material in the inner plies, and in the use of a modified vulcanizing mold. The tire shown in Fig. 5 presents all of the advantages heretofore set forth and, at the same time, has the additional advantage of a stability of structure which is not even possible in the arrangement of Fig. 4.

The advantages obtained by practicing the invention according to Fig. 5 may be further increased by proportioning the plies and molding the tire so that the beads occupy the positions in the vulcanized tire according to the illustration of Fig. 6. Fig. 6 shows the preferred form of bead and is similar to that of Fig. 5 except that during the molding operation the heels 31 of the beads are maintained tangent to the rim circle in line LM, while the toes 29 of the beads are tilted downwardly as in Fig. 5. The result is that the portions of the beads from the center lines to the toes are tilted below the rim circle, whereas the heels of the beads rearwardly from the center line of the bead are tangent to the rim circle.

In constructing a tire according to the principles of Fig. 6, the plies are proportioned substantially as set forth in connection with Fig. 5, but the molding operation is modified as just stated. When a tire, finished according to Fig. 6, is placed on a rim, the toes 29 of the beads will be lifted, tending to compress the inner plies, whereas the position of the outer plies will not be appreciably changed. The effect of this is to make the inner plies of the tire function as struts beneath the tread portion, and to become effective in destroying all tendency of the tire to sag. The fact that the inner plies are made longer than the outer plies causes them to function in the vulcanized tire in the nature of a toggle which has been broken in an upward direction so as to form a brace for the central portion of the tire underneath the tread. Whereas tires constructed according to previous methods nearly always show a tendency to sag, tires made according to the present concept, and particularly that shown in Figs. 5 and 6, avoid such tendencies. The net result is to produce a more stable tire and to increase its mileage considerably.

In the above description, various methods of practicing the present invention have been set forth, but it is to be understood that the broad principles underlying this invention are not limited to any particular structure such as those shown, but may be carried out in numerous ways so long as the inner plies of the tire are constructed to take care of the compression and expansion factors. The present method is characterized very largely by the fact that it may be applied to all present systems of manufacture by simple alteration of mechanism now used. For example, the alteration of the mechanism may consist solely in the use of a modified type of building drum such as that shown in Fig. 2 or equivalent form, the tire being molded with its bead faces tangent to the rim circle throughout.

The invention may be also carried out, in a measure, by the use of all apparatus now used and simply modifying the mold structure to tilt the beads as shown in Fig. 4. However, the full advantages of the invention can be accomplished best by increasing the widths of the inner plies and laying them on a special drum or form, and then molding the tire as in Figs. 5 and 6. Whereas mechanism used in the manufacture of tires is expensive, the production of such an improved tire by simple alterations is highly desirable, and overcomes one of the greatest obstacles in the path of mechanical improvements in the art. The principles of the invention may be applied according to Fig. 1 simply by designing the plies on a special drum and then proceeding as usual, or, as in Fig. 4, inserting two rings of wedge-shaped cross-section into the bead portion of the mold. The principles of Figs. 5 and 6 may be carried out by modifying both the mold and the inner ply widths. The inventive concept in its broadest aspect embodies fashioning the plies either by dimensioning them or positioning them by tilting the beads, or by a combination of dimensioning and positioning.

Tires produced according to the present invention, will have an increased mileage over those built by prior art methods. The absence of pulling of the beads will avoid undue stressing of certain cords, or sets of cords, or parts of the same, in the finished structure, and the stresses imparted to those cords in service will be uniform throughout the entire structure. Shifting of the cord angles during bead formation will be substantially unknown, and the large proportion of seconds produced by present methods, resulting very largely from pulling at the beads, will be enormously reduced.

The term "inflection point" used herein is employed to designate any point where a curve changes from convex to concave or concave to convex. This is characterized mathematically by a change in sign of the second derivative from positive to negative or vice versa.

Although only a few forms of apparatus have been illustrated as suitable for carrying out the principles according to this invention, it will be understood that numerous other structures may be designed to embody present principles. Consequently, according to the patent statutes, it is desired that the terminology employed be given its broadest scope commensurate with the state of the art, and without imposition of any unnecessary limitations in language or equivalents.

What I claim is:—

1. The method of building a pneumatic tire composed of superposed plies which consists in laying the plies on a drum-like building surface having a concave section on each side of the tread portion with the innermost plies dimensioned to compensate for the compression of the plies when the tire is expanded against a mold, and thereafter expanding the tire against the mold to cause the concave ply areas in said concave sections to become convex.

2. That method of building a pneumatic tire which consists in laying plies in succession on a drum-like building form having concave sections one on either side of the tread portion of the form with the inner plies of greater width than the outer ones by an amount sufficient to compensate for the compression of the inner plies when they are expanded against a mold, shaping and covering the carcass and expanding the tire against a mold to invert the plies in the concave sections and make them convex, and then vulcanizing the tire while holding the toes of the beads tilted downwardly below the rim circle of the tire.

3. The method of building a pneumatic tire which consists in laying plies in succession on a building form having concave sections one on either side of the tread portion of the form with the inner plies of greater width than the outer ones by an amount sufficient to compensate for the compression of the inner plies when they are expanded against a mold, covering the carcass, expanding the tire against the mold to invert the plies in the concave sections and make them convex, and then vulcanizing the tire while holding the heels of the beads substantially tangent to the rim circle and the toes of the beads tilted downwardly below the rim circle of the tire.

4. That step in a method of building a pneumatic tire, which consists in laying the cords successively on a building form having a sinuous cross section and including at least two concave portions and two inflection points on its building surface, the plies being so dimensioned that the cross sectional peripheries of the inner plies are sufficient to compensate for the compression of the plies during expansion and vulcanization of the tire.

5. Those steps in a method of building a pneumatic tire which consist in laying the cord plies successively on a building form having a concave section on each side of the tread portion of the form, and thereafter expanding the cord plies outwardly in a mold to make the plies convex throughout and inverting the position of said plies with respect to said concave sections.

6. Those steps in a method of building a pneumatic tire which consist in laying the cord plies successively on a building form having at least two concave portions, each being located laterally of the tread portion of the form and at a point intermediate the side of the form and said tread portion, and then expanding in a mold the tire so formed until the ply areas in said concave portions become convex and the plies assume the rounded contour of the finished tire.

CHARLES W. McKONE.